(12) United States Patent
Chang

(10) Patent No.: US 8,307,592 B2
(45) Date of Patent: Nov. 13, 2012

(54) ASSEMBLY FOR PIPE FINISHING WORK

(76) Inventor: Kyung Kun Chang, Gyeonggi-Do (KR)

( * ) Notice: Subject to any disclaimer, the term of this patent is extended or adjusted under 35 U.S.C. 154(b) by 359 days.

(21) Appl. No.: 12/697,115

(22) Filed: Jan. 29, 2010

(65) Prior Publication Data

US 2010/0192490 A1 Aug. 5, 2010

(30) Foreign Application Priority Data

Feb. 2, 2009 (KR) .................. 10-2009-0008036

(51) Int. Cl.
*E04C 2/52* (2006.01)
(52) U.S. Cl. .................. 52/220.8; 52/219; 285/139.1
(58) Field of Classification Search .............. 52/219, 52/220.8; 285/139.1, 142.1; 248/49, 56
See application file for complete search history.

(56) References Cited

U.S. PATENT DOCUMENTS

| | | | | |
|---|---|---|---|---|
| 796,178 | A * | 8/1905 | Beaton ............................ | 248/57 |
| 833,613 | A * | 10/1906 | Maiser ............................ | 248/57 |
| 2,276,139 | A * | 3/1942 | Anderson et al. ............. | 454/331 |
| 2,316,389 | A * | 4/1943 | Atkinson ....................... | 248/300 |
| 2,661,677 | A * | 12/1953 | Lingelbach ................... | 454/331 |
| 2,965,342 | A * | 12/1960 | Goldstone ...................... | 248/57 |
| 3,115,539 | A * | 12/1963 | Stuessel et al. ............... | 174/486 |
| 3,162,413 | A * | 12/1964 | Hexdall ......................... | 248/71 |
| 3,285,553 | A * | 11/1966 | Hexdall ......................... | 248/71 |
| 3,718,307 | A * | 2/1973 | Albanese ....................... | 248/57 |
| 3,894,782 | A * | 7/1975 | Hug .............................. | 439/246 |
| 4,071,267 | A * | 1/1978 | Davis ............................ | 285/64 |
| 4,309,007 | A * | 1/1982 | Logsdon ........................ | 248/56 |
| 4,335,647 | A * | 6/1982 | Timmons ....................... | 454/300 |
| 4,391,428 | A * | 7/1983 | Grimes .......................... | 248/546 |
| 4,494,296 | A * | 1/1985 | Grimes .......................... | 29/432 |
| 4,717,099 | A * | 1/1988 | Hubbard ........................ | 248/57 |
| 4,872,512 | A * | 10/1989 | Multer ........................... | 169/51 |
| 4,946,117 | A * | 8/1990 | Liesegang ...................... | 248/65 |
| 5,044,582 | A * | 9/1991 | Walters .......................... | 248/57 |
| 5,144,777 | A * | 9/1992 | Fishel et al. ................... | 52/144 |
| 5,456,050 | A * | 10/1995 | Ward .............................. | 52/220.8 |
| 5,722,699 | A * | 3/1998 | Brancher ....................... | 285/142.1 |
| 5,967,567 | A * | 10/1999 | Nordstrom .................... | 285/139.1 |
| 5,971,664 | A * | 10/1999 | Wilson .......................... | 405/184.4 |
| 6,123,154 | A * | 9/2000 | MacDonald et al. .......... | 169/37 |
| 6,330,773 | B1 * | 12/2001 | MacDonald et al. .......... | 52/239 |
| 6,332,597 | B1 * | 12/2001 | Korcz et al. ................... | 248/343 |
| 6,341,466 | B1 * | 1/2002 | Kehoe et al. .................. | 52/712 |
| 6,519,791 | B2 * | 2/2003 | Randolph ...................... | 4/695 |
| 6,536,169 | B2 * | 3/2003 | Dykhoff ........................ | 52/220.8 |

(Continued)

FOREIGN PATENT DOCUMENTS

JP 06109167 A * 4/1994

(Continued)

*Primary Examiner* — Joshua J Michener
*Assistant Examiner* — Charissa Ahmad
(74) *Attorney, Agent, or Firm* — Nixon Peabody LLP

(57) ABSTRACT

An assembly for a pipe finishing work includes a support bracket supported on side walls, facing each other, of a pair of studs separated from each other and having a guide rail formed long in a direction crossing the pair of studs, a panel member penetrated by a pipe arranged between the pair of studs and having a finishing member coupled thereto to close a gap between the pair of studs in a state in which the penetrating pipe is exposed outside, and a guide rib installed at the guide rail to be capable of sliding with the panel member along the guide rail to position align the panel member with respect to the pipe.

4 Claims, 4 Drawing Sheets

U.S. PATENT DOCUMENTS

| | | | | |
|---|---|---|---|---|
| 6,729,083 B1 * | 5/2004 | Soyko | | 52/220.8 |
| 7,040,586 B2 * | 5/2006 | Kusber et al. | | 248/200.1 |
| 7,434,770 B2 * | 10/2008 | Schmidt | | 248/49 |
| 7,490,600 B2 * | 2/2009 | Kopp | | 126/82 |
| 7,498,511 B1 * | 3/2009 | Brown | | 174/40 R |
| 7,510,159 B2 * | 3/2009 | Rippel | | 248/343 |
| 7,673,427 B2 * | 3/2010 | Morey | | 52/220.8 |
| 2003/0006353 A1 * | 1/2003 | Dinh et al. | | 248/343 |
| 2003/0042371 A1 * | 3/2003 | McCahill et al. | | 248/57 |
| 2004/0016191 A1 * | 1/2004 | Whitty | | 52/232 |

FOREIGN PATENT DOCUMENTS

JP  06201070 A  *  7/1994

* cited by examiner

ASSEMBLY FOR PIPE FINISHING WORK

CROSS-REFERENCE TO RELATED PATENT APPLICATIONS

This application claims priority to Korean Patent Application No. 10-2009-0008036, filed on Feb. 2, 2009, in the Korean Intellectual Property Office, the disclosure of which is incorporated herein in its entirety by reference.

BACKGROUND OF THE INVENTION

1. Field of the Invention

The present invention relates to an assembly for a pipe finishing work, and more particularly, to an assembly for a pipe finishing work which may improve efficiency of the work when a pipe to connect to a washstand, a sink, or a washing machine is built between a pair of studs, and efficiently perform maintenance and repair.

2. Description of the Related Art

In general, when a pipe is connected to a washstand, a sink, a washing machine (hereinafter, referred to as the connection object), the pipe is partially exposed outside and connects to the connection object and the remaining portion thereof is built in the wall. The pipe is connected to the connection object by first connecting one end of the pipe to a connection pipe arranged in the wall during construction of a building, and then connecting the other end of the pipe to the connection object. The cut and opened area of the drywall is finished by using a finishing member such as plasterboard. However, the connection method has the following demerits.

That is, in the process of finishing the cut and opened area using the finishing member, the finishing member is formed such that the finishing material and the pipe do not interfere with each other. Then, the pipe and the finishing member are combined to each other so that the pipe may penetrate the finishing member to be exposed outside. In the finishing process, since the finishing member should not interface with the pipe, a large gap may be generated between the pipe and the finishing member. Thus, to complete the process to connect the pipe to the connection pipe and the connection object, a post-process to fill out the gap after the pipe and the finishing member are combined to each other is additionally needed. As a result, a conventional plumbing method has a demerit that the work time and costs are increased.

Also, when the connection pipe built in the wall becomes decrepit and requires repair or replacement, the finishing member needs to be totally destroyed or partially cut away for the repair or replacement of the connection pipe. In particular, after the repair or replacement of the connection pipe, a post-process such as reinstallation of the finishing member or filling out of the cut-away portion is needed. Therefore, according to the conventional plumbing method, when the connection pipe built in the wall needs repair or replacement, the time and cost for repair or replacement area increased.

SUMMARY OF THE INVENTION

To solve the above and/or other problems, the present invention provides an assembly for a pipe finishing work which may improve work efficiency and reduce construction costs by smoothly performing a pipe connection and finishing work, and reduce repair and maintenance costs.

According to an aspect of the present invention, an assembly for a pipe finishing work includes a support bracket supported on side walls, facing each other, of a pair of studs separated from each other and having a guide rail formed long in a direction crossing the pair of studs, a panel member penetrated by a pipe arranged between the pair of studs and having a finishing member coupled thereto to close a gap between the pair of studs in a state in which the penetrating pipe is exposed outside, and a guide rib installed at the guide rail to be capable of sliding with the panel member along the guide rail to position align the panel member with respect to the pipe.

The support bracket may include a first bracket coupled to any one of the pair of studs and having the guide rail, a second bracket coupled to the other one of the pair of studs and coupled to the first bracket to be capable of relatively moving in a lengthwise direction of the guide rail, and a position fixing unit to position fix the second bracket with respect to the first bracket.

To prevent the guide rib from being detached from the guide rail, a guide groove may be formed long in the lengthwise direction of the guide rail and an insertion step may be provided at the guide rib and inserted in the guide groove.

The panel member may include a body portion having a plate shape and having a front surface contacting the finishing member and a rear surface connected to the guide rib, a first protruding portion forwardly extending from the body portion and inserted in an insertion hole of the finishing member, and a second protruding portion forwardly extending from the first protruding portion, having a diameter smaller than that of the first protruding portion, and a through hole through which the pipe passes. The assembly may further include a cover block which includes a cover portion coupled to the finishing member, and an insertion portion extending from the cover portion and inserted in a gap between the first and second protruding portions, to prevent a side wall defining the insertion hole of the finishing member when the finishing member contacts the panel member.

The cover block, the finishing member, and the panel member may be coupled to one another by a coupling unit that sequentially penetrates the through hole of the cover block and the finishing member and is coupled to a coupling hole of the panel member, and a position align groove may be formed in any one of the second protruding portion of the panel member and the insertion portion of the cover block, and a position align step inserted in the position align groove may be provided in the other one of the second protruding portion of the panel member, to coaxially position align the through hole of the cover block and the coupling hole of the panel member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
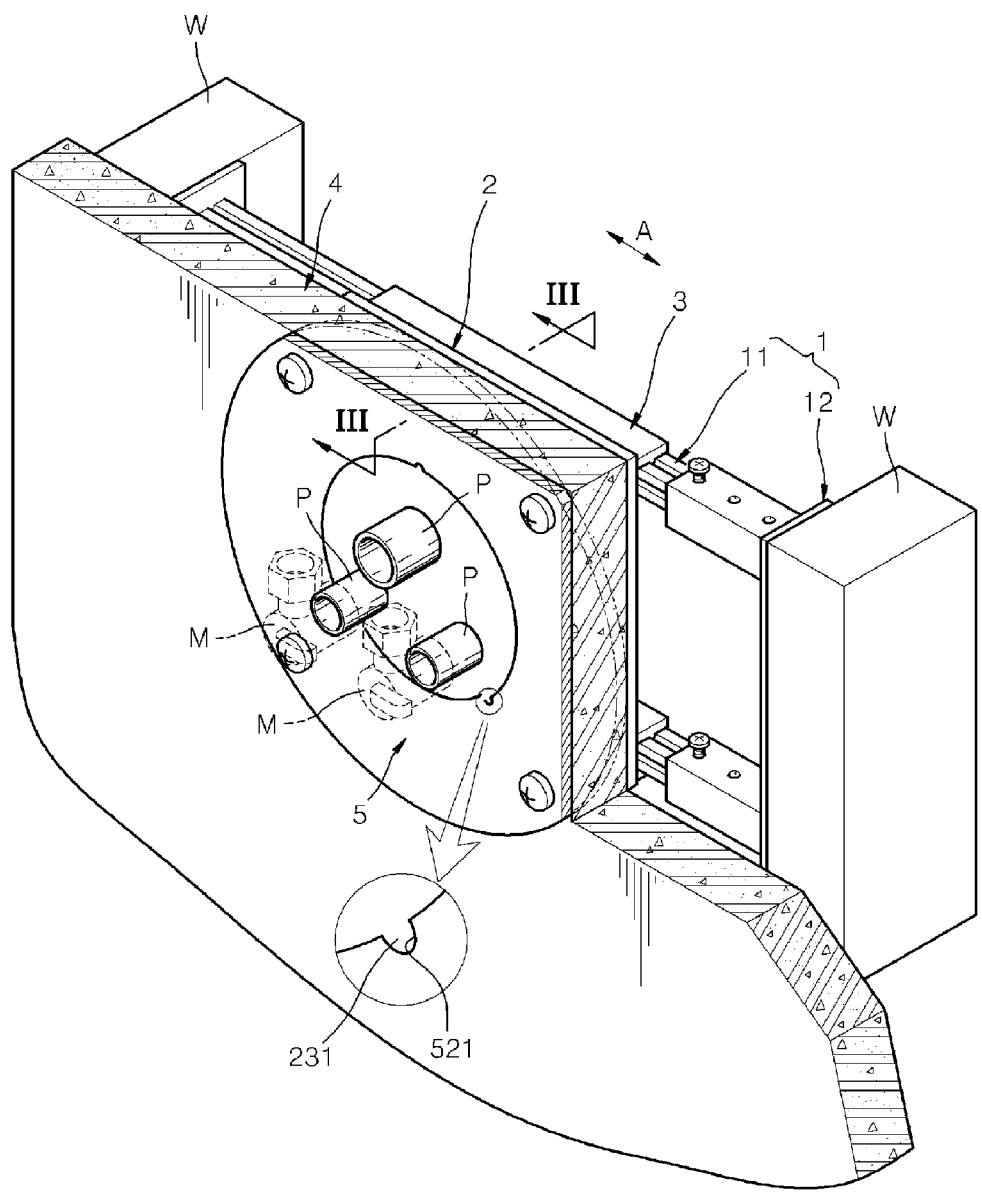
FIG. 1 is a partially cut-away perspective view of an assembly for a pipe finishing work according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
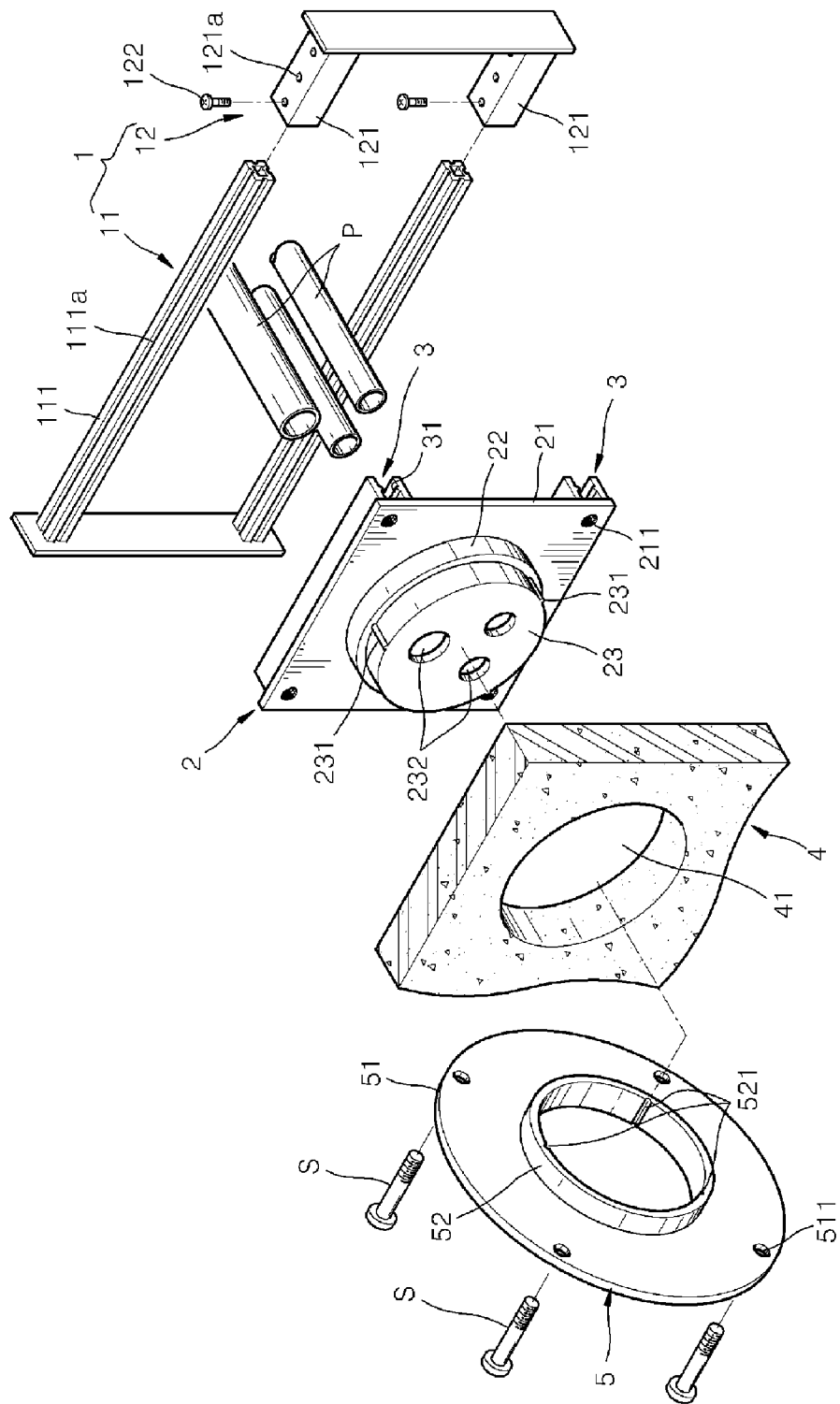
FIG. 2 is an exploded perspective view of the assembly for a pipe finishing work of FIG. 1.
Figure 3:
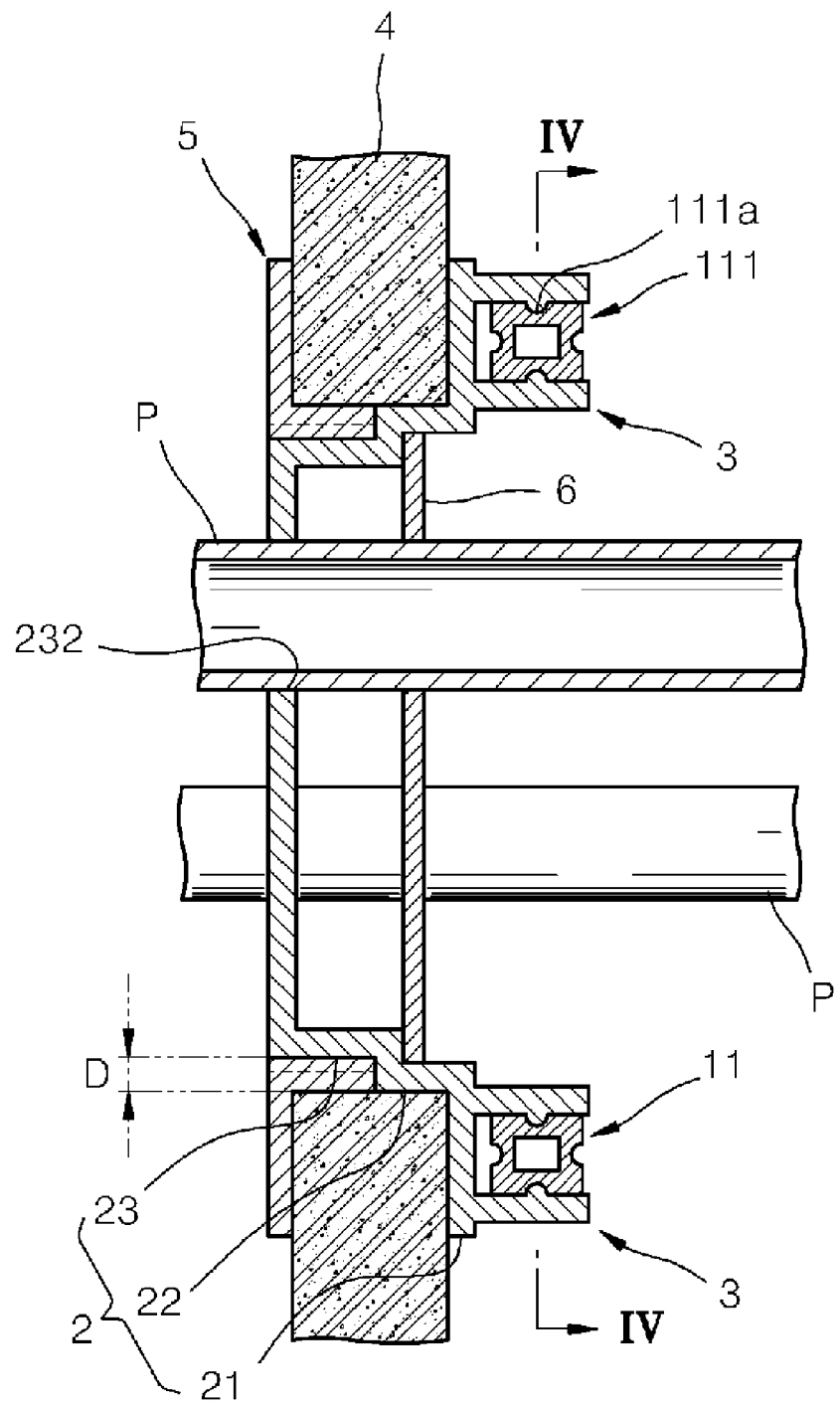
FIG. 3 is a cross-sectional view taken along line III-III of FIG. 1.
Figure 4:
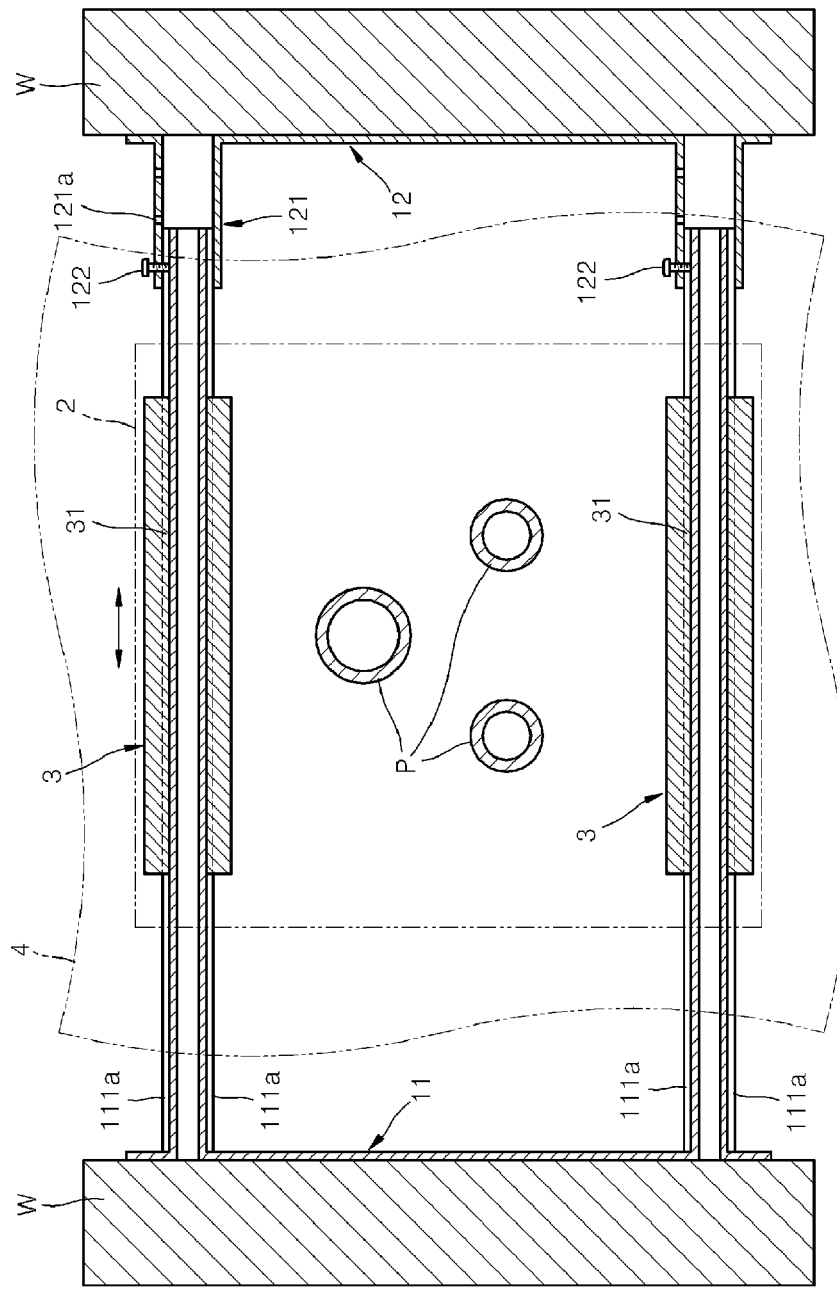
FIG. 4 is a cross-sectional view taken along line IV-IV of FIG. 3.

FIG. 1 is a partially cut-away perspective view of an assembly for a pipe finishing work according to an embodiment of the present invention. FIG. 2 is an exploded perspective view of the assembly for a pipe finishing work of FIG. 1. FIG. 3 is a cross-sectional view taken along line III-III of FIG. 1. FIG. 4 is a cross-sectional view taken along line IV-IV of FIG. 3.

Referring to FIGS. 1-4, an assembly for a pipe (P) finishing work according to the present embodiment includes a support bracket 1, a panel member 2, and a guide rib 3. The support bracket 1 is supported on side walls, facing each other, of a pair of studs W that are separated from each other. In the present embodiment, the support bracket 1 includes a first bracket 11, a second bracket 12, and a position fixing portion.

The support bracket 11 is coupled to any one of the studs W and has a guide rail 111 having a rectangular pipe shape formed long in a direction A crossing the studs W. A guide groove 111a is formed long in the guide rail 111 in the lengthwise direction A of the guide rail 111. Since an insertion step 31 of the guide rib 3 is inserted in the guide groove 111a, the guide rib 3 is prevented from being detached from the guide rail 111.

The second bracket 12 is coupled to the other one of the studs W and includes a coupling portion 121 that is coupled to the first bracket 11 to be capable of relatively moving in the lengthwise direction A of the guide rail 111. A plurality of screw holes 121a are formed in a predetermined interval D in the lengthwise direction A of the guide rail 111. In the present embodiment, the position fixing portion is a position fixing bolt 122 that is coupled to any one of the screw holes 121a. The position fixing portion makes the first bracket 11 closely contact the inner wall of the second bracket 12 so that the relative movement between the first and second brackets 11 and 12 may be prevented.

Since the relative movement between the first and second brackets 11 and 12 is possible in the present embodiment, the present embodiment may be commonly employed when the interval between the studs W is different. The pipe P arranged between the studs W penetrates the panel member 2. In the present embodiment, the panel member 2 includes a body portion 21 having a plate shape, a first protruding portion 22, and a second protruding portion 23.

A finishing member 4 contacts the front surface of the body portion 21. The finishing member 4 is formed of plasterboard to close a gap between the studs W when the pipe P penetrating the body portion 21 is exposed outside. The finishing member 4 has an insertion hole 41 through which the first protruding portion 22 passes. The pipe P is exposed outside by sequentially passing through the panel member 2 and the finishing member 4. A plurality of coupling holes 211 are formed in the body portion 21. A coupling member such as a screw that sequentially passes through a cover block 5, which will be described later, and the finishing member 4 are coupled to each of the coupling holes 211.

The guide rib 3 is connected to the rear surface of the body portion 21. The guide rib 3 is installed at the guide rail 111 to be capable of sliding along the guide rail 111. Since the guide rib 3 is connected to the body portion 21, the guide rib 3 is moved along the panel member 2.

In the present embodiment, since the panel member 2 may be relatively moved with respect to the support bracket 1, the panel member 2 may be position aligned to the pipe P. Thus, according to the present embodiment, the pipe P may be efficiently connected to the connection pipe that is previously built at the construction of a building.

The first protruding portion 22 of the panel member 2 forwardly extends from the body portion 21 and is inserted in the insertion hole 41 of the finishing member 4. As a result, the rear surface of the finishing member 4 contacts the body portion 21 of the panel member 2.

The second protruding portion 23 of the panel member 2 forwardly extends from the first protruding portion 22, has a diameter smaller than that of the first protruding portion 22, and includes a through hole 232 through which the pipe P passes. As the diameter of the second protruding portion 23 is smaller than that of the first protruding portion 22, an interval D is generated in a radial direction between the outer circumferential surface of the first protruding portion 22 and the outer circumferential surface of the second protruding portion 23. Also, since the first protruding portion 22 is inserted in the insertion hole 41 of the finishing member 4, an interval is generated between a side wall defining the insertion hole 41 and the outer circumferential surface of the second protruding portion 22. An insertion portion 52 of the cover block 5 is inserted in the interval D. The cover block 5 and the panel member 2 are coupled by using a screw S. The pipe P is connected to a valve M.

The present embodiment configured as above has the following operation. That is, the insertion hole 41 of the finishing member 4 is formed directly at a construction site as necessary. It is not easy to form the insertion hole 41 such that the side wall defining the insertion hole 41 can accurately contact the outer circumferential surface of the first protruding portion 22. Accordingly, the insertion hole 41 has a rough inner circumferential surface not a circular shape such as the outer circumferential surface of the first protruding portion 22. It is aesthetically unpleasant when the rough inner circumferential surface is exposed outside.

Thus, the cover block 5 is provided in the present embodiment. The cover block 5 includes a cover portion 51 coupled to the finishing member 4 and an insertion portion 52 that is inserted in the above-described interval D. As the insertion portion 52 is inserted in the interval D and the cover portion 51 is coupled to the front surface of the finishing member 4, the insertion hole 41 having the rough inner circumferential surface may be closed. Accordingly, the overall outer appearance may be aesthetically pleasant after the pipe P connection and finishing work is completed.

The cover block 5 and the finishing member 4 and the panel member 2 are coupled to one another by a coupling unit that sequentially penetrates a through hole 511 of the cover block 5 and the finishing member 4 and is coupled to the coupling hole 211 of the panel member 2. Accordingly, since three parts are coupled by one coupling process, efficiency of work efficiency at a construction site may be improved.

To further improve the work efficiency at a construction site, while a position alignment groove 521 is formed at any one of the second protruding portion 23 and the insertion portion 52, a position alignment step 231 that is inserted in the position alignment groove 521 may be provided at the other one of the second protruding portion 23 and the insertion portion 52. In the present embodiment, the position alignment step 231 is provided at the second protruding portion 23 and the position alignment groove 521 is provided at the insertion portion 52. Accordingly, the through hole 511 of the cover block 5 and the coupling hole 211 of the panel member 2 may be coaxially position aligned. As a result, the coupling between the cover block 5, the finishing member 4, and the panel member 2 may be easily performed.

A steel plate member 6 prevents heat from being transferred to the panel member 2 when the pipe P and the connection pipe are connected by welding. The process of connecting and finishing a pipe by using an assembly for a pipe finishing work according to an embodiment of the present invention, and the operation of the present embodiment, will be described below.

First, an interval between the studs W is measured. The first bracket 11 of the support bracket 1 is coupled to any one of the studs W. The second bracket 12 of the support bracket 1 is appropriately moved with respect to the first bracket 11 to be coupled to the other one of the studs W. Since the interval between the first and second brackets 11 and 12 may be adjusted according to the interval between the studs W, the present embodiment may be commonly employed for the studs having different intervals.

After the support bracket 1 is supported on the studs W, the guide rib 3 of the first bracket 11 is supported on the panel member 2. In doing so, since the connection pipe that is previously built at the construction of a building is inserted in the through hole 232 of the panel member 2, a work to move the panel member 2 to the left and right with respect to the guide rib 3 is needed. In the present embodiment, to meet the above condition, the guide rail 111 of the panel member 2 is installed to be capable of relatively moving with respect to the guide rib 3. Thus, the work may be easily performed without the position of the connection pipe at the construction site.

When the panel member 2 is supported by the support bracket 1 and the pipe P is connected to the connection pipe, the gap between the studs W is closed by using the finishing member 4. That is, the finishing member 4 is pushed to closely contact the panel member 2 such that the first protruding portion 22 of the panel member 2 can be inserted in the insertion hole 41 of the finishing member 4. Then, the cover block 5 is pushed to closely contact the finishing member 4 such that the insertion portion 52 of the cover block 5 can be inserted in the interval between the first and second protruding portions 22 and 23. Finally, the position fixing bolt 122 that sequentially penetrates the cover block 5 and the finishing member 4 is coupled to the panel member 2 so that the pipe P connection and finishing work may be completed.

As described above, according to the assembly for a pipe finishing work according to the present invention, since the cut and unfinished area is finished by a finishing members during the pipe connection and finishing work without an additional post-process work unlike the conventional technology, the efficiency of work efficiency at a construction site may be improved. Also, when the connection pipe built between the studs needs repair or replacement, the finishing member does not need to be totally destroyed or partially cut off unlike the conventional technology. Thus, the costs for repair or replacement of the connection pipe may be reduced and the efficiency of work efficiency in the repair or replacement may be improved.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An assembly for a pipe finishing work, the assembly comprising:
    a support bracket supported on side walls, facing each other, of a pair of studs separated from each other and having a guide rail formed long in a direction crossing the pair of studs;
    a panel member penetrated by a pipe arranged between the pair of studs and having a finishing member coupled thereto to close a gap between the pair of studs in a state in which the penetrating pipe is exposed outside;
    a guide rib installed at the guide rail to be capable of sliding with the panel member along the guide rail to position align the panel member with respect to the pipe; and
    a cover block,
    wherein the panel member comprises:
        a body portion having a plate shape and having a front surface contacting the finishing member and a rear surface connected to the guide rib;
        a first protruding portion forwardly extending from the body portion and inserted in an insertion hole of the finishing member; and
        a second protruding portion forwardly extending from the first protruding portion, having a diameter smaller than that of the first protruding portion, and a through hole through which the pipe passes,
    wherein the cover block comprises:
    a cover portion coupled to the finishing member; and
    an insertion portion extending from the cover portion and inserted in a gap between the first and second protruding portions, to prevent a side wall defining the insertion hole of the finishing member from being exposed when the finishing member contacts the panel member.

2. The assembly of claim 1, wherein the support bracket comprises:
    a first bracket coupled to any one of the pair of studs and having the guide rail;
    a second bracket coupled to the other one of the pair of studs and coupled to the first bracket to be capable of relatively moving in a lengthwise direction of the guide rail; and
    a position fixing unit to position fix the second bracket with respect to the first bracket.

3. The assembly of claim 1, wherein, to prevent the guide rib from being detached from the guide rail, a guide groove is formed long in the lengthwise direction of the guide rail and an insertion step is provided at the guide rib and inserted in the guide groove.

4. The assembly of claim 1, wherein the cover block, the finishing member, and the panel member are coupled to one another by a coupling unit that sequentially penetrates the through hole of the cover block and the finishing member and is coupled to a coupling hole of the panel member, and
    a position align groove is formed in any one of the second protruding portion of the panel member and the insertion portion of the cover block, and a position align step inserted in the position align groove is provided in the other one of the second protruding portion of the panel member, to coaxially position align the through hole of the cover block and the coupling hole of the panel member.

* * * * *